(12) United States Patent
Spooner et al.

(10) Patent No.: US 8,655,052 B2
(45) Date of Patent: Feb. 18, 2014

(54) METHODOLOGY FOR 3D SCENE RECONSTRUCTION FROM 2D IMAGE SEQUENCES

(75) Inventors: David A. Spooner, Calgary (CA); Sonny Chan, Calgary (CA); Christopher L. Simmons, Calgary (CA)

(73) Assignee: Intellectual Discovery Co., Ltd., Seoul (KR)

( * ) Notice: Subject to any disclaimer, the term of this patent is extended or adjusted under 35 U.S.C. 154(b) by 664 days.

(21) Appl. No.: 11/627,414

(22) Filed: Jan. 26, 2007

(65) Prior Publication Data

US 2008/0181486 A1   Jul. 31, 2008

(51) Int. Cl.
*G06K 9/00* (2006.01)
*G06K 9/40* (2006.01)
*G06T 15/00* (2011.01)
*H04N 13/04* (2006.01)

(52) U.S. Cl.
USPC ............. 382/154; 382/254; 345/419; 348/51

(58) Field of Classification Search
USPC ................... 382/154, 254; 345/419; 348/51
See application file for complete search history.

(56) References Cited

U.S. PATENT DOCUMENTS

| | | | |
|---|---|---|---|
| 4,689,616 A | 8/1987 | Goude et al. |
| 4,925,294 A | 5/1990 | Geshwind et al. |
| 5,323,007 A | 6/1994 | Wernick et al. |
| 5,614,941 A | 3/1997 | Hines |
| 5,621,815 A | 4/1997 | Talukdar et al. |
| 5,684,943 A | 11/1997 | Abraham et al. |
| 5,729,471 A | 3/1998 | Jain et al. |
| 5,742,291 A | 4/1998 | Palm |
| 5,748,199 A | 5/1998 | Palm |
| 5,805,117 A | 9/1998 | Mazurek et al. |
| 5,969,722 A | 10/1999 | Palm |
| 5,977,978 A | 11/1999 | Carey et al. |
| 5,990,900 A | 11/1999 | Seago |

(Continued)

FOREIGN PATENT DOCUMENTS

| | | |
|---|---|---|
| EP | 1 308 902 A2 | 5/2003 |
| EP | 1 141 893 | 4/2005 |

(Continued)

OTHER PUBLICATIONS

M. Pollefeys, et al., "Visual Modeling with a Hand-Held Camera," *International Journal of Computer Vision*, Sep. 2004, pp. 207-232, vol. 59, No. 3, Kluwer Academic Publishers, Manufactured in The Netherlands.

(Continued)

*Primary Examiner* — Kathleen Y Dulaney
(74) *Attorney, Agent, or Firm* — McDermott Will & Emery LLP

(57) ABSTRACT

The present invention is directed to a system and method for interactive and iterative reconstruction in a manner that helps to reduce computational requirements by generating a model from a subset of the available data, and then refining that model using additional data. Example embodiments directed to scene reconstruction, reconstruct a 3D scene from a plurality of 2D images of that scene by first generating a model of the 3D scene from a subset a of the 2D images. The model can then be refined using specific characteristics of each image in the subset that are calculated using the other images in the subset. The model is further refined using images not in the original subset.

20 Claims, 4 Drawing Sheets

(56) References Cited

U.S. PATENT DOCUMENTS

| | | | |
|---|---|---|---|
| 6,009,189 A * | 12/1999 | Schaack | 382/154 |
| 6,016,150 A | 1/2000 | Lengyel et al. | |
| 6,031,564 A | 2/2000 | Ma et al. | |
| 6,049,628 A | 4/2000 | Chen et al. | |
| 6,061,083 A | 5/2000 | Aritake et al. | |
| 6,128,132 A | 10/2000 | Wieland et al. | |
| 6,134,345 A | 10/2000 | Berman et al. | |
| 6,134,346 A | 10/2000 | Berman et al. | |
| 6,151,404 A | 11/2000 | Pieper | |
| 6,204,912 B1 | 3/2001 | Tsuchiya et al. | |
| 6,208,347 B1 | 3/2001 | Migdal et al. | |
| 6,208,360 B1 | 3/2001 | Doi et al. | |
| 6,215,516 B1 | 4/2001 | Ma et al. | |
| 6,226,004 B1 | 5/2001 | Nishihara | |
| 6,278,460 B1 | 8/2001 | Myers et al. | |
| 6,320,984 B1 | 11/2001 | Shigeta | |
| 6,333,749 B1 | 12/2001 | Reinhardt et al. | |
| 6,342,887 B1 | 1/2002 | Munroe | |
| 6,359,630 B1 | 3/2002 | Morse et al. | |
| 6,429,875 B1 | 8/2002 | Pettigrew et al. | |
| 6,434,278 B1 | 8/2002 | Hashimoto | |
| 6,456,745 B1 | 9/2002 | Bruton et al. | |
| 6,466,205 B2 * | 10/2002 | Simpson et al. | 345/419 |
| 6,477,267 B1 | 11/2002 | Richards et al. | |
| 6,504,569 B1 | 1/2003 | Jasinschi et al. | |
| 6,549,200 B1 | 4/2003 | Mortlock et al. | |
| 6,580,821 B1 | 6/2003 | Roy | |
| 6,588,908 B2 | 7/2003 | Shimizu | |
| 6,603,504 B1 | 8/2003 | Son et al. | |
| 6,674,925 B1 | 1/2004 | Schoepflin et al. | |
| 6,714,196 B2 | 3/2004 | McCormack et al. | |
| 6,760,020 B1 | 7/2004 | Uchiyama et al. | |
| 6,867,750 B2 | 3/2005 | Noro | |
| 6,867,787 B1 | 3/2005 | Shimizu et al. | |
| 6,956,576 B1 | 10/2005 | Deering et al. | |
| 6,989,840 B1 | 1/2006 | Everitt et al. | |
| 7,053,904 B1 | 5/2006 | Kirk et al. | |
| 7,102,652 B2 | 9/2006 | O'Donnell et al. | |
| 7,116,323 B2 | 10/2006 | Kaye et al. | |
| 7,148,907 B2 | 12/2006 | Smith et al. | |
| 7,181,081 B2 | 2/2007 | Sandrew | |
| 7,289,662 B2 | 10/2007 | Keaton et al. | |
| 7,344,256 B2 | 3/2008 | Watanabe et al. | |
| 7,453,456 B2 | 11/2008 | Petrov et al. | |
| 7,453,489 B2 * | 11/2008 | Ezawa | 348/51 |
| 7,474,803 B2 | 1/2009 | Petrov et al. | |
| 7,508,977 B2 | 3/2009 | Lyons et al. | |
| 7,542,034 B2 | 6/2009 | Spooner et al. | |
| 7,616,834 B2 * | 11/2009 | Kramer et al. | 382/276 |
| 7,643,966 B2 * | 1/2010 | Adachi et al. | 703/1 |
| 7,706,603 B2 * | 4/2010 | Najafi et al. | 382/154 |
| 7,853,085 B2 | 12/2010 | Miller | |
| 7,889,913 B2 | 2/2011 | Wells | |
| 7,907,774 B2 | 3/2011 | Parr et al. | |
| 7,907,793 B1 | 3/2011 | Sandrew | |
| 7,965,892 B2 | 6/2011 | Kanatsu | |
| 8,055,046 B2 * | 11/2011 | Feilkas et al. | 382/131 |
| 8,217,931 B2 | 7/2012 | Lowe et al. | |
| 8,274,530 B2 | 9/2012 | Birtwistle et al. | |
| 2001/0031073 A1 * | 10/2001 | Tajima | 382/118 |
| 2001/0040570 A1 | 11/2001 | Light et al. | |
| 2002/0030675 A1 | 3/2002 | Kawai | |
| 2002/0122113 A1 * | 9/2002 | Foote | 348/48 |
| 2002/0122585 A1 | 9/2002 | Swift et al. | |
| 2002/0126117 A1 | 9/2002 | Grzeszczuk et al. | |
| 2002/0126396 A1 | 9/2002 | Dolgoff | |
| 2002/0164067 A1 | 11/2002 | Askey et al. | |
| 2002/0186348 A1 | 12/2002 | Covannon et al. | |
| 2003/0021453 A1 | 1/2003 | Weise et al. | |
| 2003/0058242 A1 | 3/2003 | Redlich | |
| 2003/0090482 A1 | 5/2003 | Rousso et al. | |
| 2003/0099397 A1 | 5/2003 | Matsugu et al. | |
| 2003/0161526 A1 * | 8/2003 | Jupiter et al. | 382/154 |
| 2003/0164893 A1 | 9/2003 | Mayhew | |
| 2003/0179923 A1 * | 9/2003 | Xiong et al. | 382/154 |
| 2003/0202120 A1 | 10/2003 | Mack | |
| 2003/1018473 | 10/2003 | Price | |
| 2001/0214533 | 11/2003 | Cull at al. | |
| 2003/0210329 A1 * | 11/2003 | Aagaard et al. | 348/159 |
| 2004/0081354 A1 | 4/2004 | Mojsilovic et al. | |
| 2004/1018051 | 8/2004 | Lea at al | |
| 2004/0218788 A1 * | 11/2004 | Geng | 382/118 |
| 2004/0247174 A1 * | 12/2004 | Lyons et al. | 382/154 |
| 2004/0258309 A1 * | 12/2004 | Keaton et al. | 382/190 |
| 2004/0264806 A1 | 12/2004 | Herley | |
| 2005/0052452 A1 * | 3/2005 | Baumberg | 345/419 |
| 2005/0094879 A1 | 5/2005 | Harville | |
| 2005/0117215 A1 | 6/2005 | Lange | |
| 2005/0140670 A1 | 6/2005 | Wu et al. | |
| 2005/0151751 A1 | 7/2005 | Hong et al. | |
| 2005/0166163 A1 | 7/2005 | Chang et al. | |
| 2005/0216237 A1 | 9/2005 | Adachi et al. | |
| 2006/1020764 | 9/2005 | Maeda | |
| 2005/0223337 A1 | 10/2005 | Wheeler et al. | |
| 2005/0231505 A1 | 10/2005 | Kaye et al. | |
| 2005/0243088 A1 | 11/2005 | Lengyel | |
| 2006/0023197 A1 | 2/2006 | Joel | |
| 2006/0033762 A1 | 2/2006 | Card et al. | |
| 2006/0044527 A1 | 3/2006 | Watanabe et al. | |
| 2006/1006757 | 3/2006 | Perlmutter et at. | |
| 2008/1006158 | 3/2006 | Spooner et al. | |
| 2006/0088203 A1 * | 4/2006 | Boca et al. | 382/153 |
| 2006/0114253 A1 | 6/2006 | Zitnick, III et al. | |
| 2006/0126919 A1 | 6/2006 | Kitaura et al. | |
| 2006/0140473 A1 * | 6/2006 | Brooksby et al. | 382/154 |
| 2006/0153454 A1 | 7/2006 | Grimme | |
| 2006/1019277 | 8/2006 | Nomura et al. | |
| 2008/1017158 | 8/2006 | Sandrew | |
| 2006/0221248 A1 | 10/2006 | McGuire et al. | |
| 2006/0232583 A1 * | 10/2006 | Petrov et al. | 345/419 |
| 2007/0009179 A1 | 1/2007 | Easwar | |
| 2007/0013813 A1 | 1/2007 | Sun et al. | |
| 2007/0024635 A1 | 2/2007 | Jojic et al. | |
| 2007/0031037 A1 | 2/2007 | Blake et al. | |
| 2007/0081714 A1 * | 4/2007 | Wallack et al. | 382/152 |
| 2007/0097120 A1 | 5/2007 | Wheeler et al. | |
| 2007/0103459 A1 * | 5/2007 | Stoval et al. | 345/419 |
| 2007/0153122 A1 | 7/2007 | Ayite et al. | |
| 2007/0192757 A1 | 8/2007 | Emi et al. | |
| 2007/0253618 A1 * | 11/2007 | Kim et al. | 382/154 |
| 2007/0258632 A1 | 11/2007 | Friedman et al. | |
| 2007/0294270 A1 | 12/2007 | Gregory et al. | |
| 2007/0296721 A1 * | 12/2007 | Chang et al. | 345/427 |
| 2008/0018732 A1 | 1/2008 | Moller | |
| 2008/0056716 A1 | 3/2008 | Fujikawa | |
| 2008/0056719 A1 | 3/2008 | Bernard et al. | |
| 2008/0074438 A1 | 3/2008 | Maillot | |
| 2008/0095416 A1 * | 4/2008 | Jeung et al. | 382/128 |
| 2008/0099682 A1 | 5/2008 | Gordon et al. | |
| 2008/0111816 A1 | 5/2008 | Abraham et al. | |
| 2008/0123937 A1 * | 5/2008 | Arias Estrada et al. | 382/154 |
| 2008/0225040 A1 | 9/2008 | Simmons et al. | |
| 2008/0225042 A1 | 9/2008 | Birtwistle et al. | |
| 2008/0225045 A1 | 9/2008 | Birtwistle et al. | |
| 2008/0225059 A1 | 9/2008 | Lowe et al. | |
| 2008/0226123 A1 | 9/2008 | Birtwistle et al. | |
| 2008/0226128 A1 | 9/2008 | Birtwistle et al. | |
| 2008/0226160 A1 | 9/2008 | Birtwistle et al. | |
| 2008/0226181 A1 | 9/2008 | Birtwistle et al. | |
| 2008/0226194 A1 | 9/2008 | Birtwistle et al. | |
| 2008/0228449 A1 | 9/2008 | Birtwistle et al. | |
| 2008/0246836 A1 | 10/2008 | Lowe et al. | |
| 2008/0259073 A1 | 10/2008 | Lowe et al. | |
| 2009/0116732 A1 | 5/2009 | Zhou et al. | |
| 2011/0164109 A1 | 7/2011 | Baldridge et al. | |
| 2011/0169914 A1 | 7/2011 | Lowe et al. | |
| 2011/0227917 A1 | 9/2011 | Lowe et al. | |
| 2012/0032948 A1 | 2/2012 | Lowe et al. | |
| 2012/0274638 A1 | 11/2012 | Birtwistle et al. | |
| 2012/0275652 A1 | 11/2012 | Birtwistle et al. | |
| 2012/0275687 A1 | 11/2012 | Lowe et al. | |
| 2012/0275689 A1 | 11/2012 | Birtwistle et al. | |
| 2012/0280989 A1 | 11/2012 | Birtwistle et al. | |

(56) References Cited

U.S. PATENT DOCUMENTS

2012/0313940 A1 12/2012 Birtwistle et al.

FOREIGN PATENT DOCUMENTS

| GB | 2 365 243 A | 2/2002 |
|---|---|---|
| JP | 7-230556 | 8/1995 |
| JP | 9-091436 | 4/1997 |
| JP | 09-186957 | 7/1997 |
| JP | 09-237346 | 9/1997 |
| JP | 10-111934 | 4/1998 |
| JP | 2000-194863 A | 7/2000 |
| JP | 2000-353244 | 12/2000 |
| WO | WO-2007/130122 A2 | 11/2007 |
| WO | WO-2007/142643 A1 | 12/2007 |
| WO | WO-2007/142649 | 12/2007 |
| WO | WO-2007/148219 A2 | 12/2007 |
| WO | WO-2008/051231 A1 | 5/2008 |
| WO | WO-2008/060289 A1 | 5/2008 |
| WO | WO-2008/063167 | 5/2008 |
| WO | WO-2008/063170 | 5/2008 |
| WO | WO-2008/112804 | 9/2008 |
| WO | WO-2008/112806 | 9/2008 |

OTHER PUBLICATIONS

E. Mouragnon et al., "Real time localization and 3D reconstruction," Proceedings of the 2006 IEEE Computer Society Conference on Computer Vision and Pattern Recognition (CVPR'06), 8 pages.

The Extended European Search Report issued for EP08250323.6, dated May 5, 2011, 8 pages.

Office Action issued for Japanese Patent Application No. 2008-013351, dated Dec. 5, 2011, 2 pages.

U.S. Appl. No. 10/946,955, filed Sep. 22, 2004, Spooner et al.

U.S. Appl. No. 11/627,414, filed Jan. 26, 2007, Spooner et al.

International Search Report and Written Opinion issued for PCT/US2008/056661; Dated: Jul. 14, 2008; 10 Pages.

G. Vosselman et al., "Recognising Structure in Laser Scanner Point Clouds", published by IAPRS and found at www.itc.nl/personal/vosselman/papers/vosselman2004.natscan.pdf.

Tamal K. Dey et al., "Shape Segmentation and Matching from Noisy Point Clouds", Proc. Eurographics Sympos. Point-Based Graphics (2004), Marc Alexa and S. Rusinkiewicz (eds) (2004), pp. 193-199.

Yang Liu et al., "Reconstructing B-Spline Curves from Point Clouds—A Tangential Flow Approach Using Least Squares Minimization", International Conference on Shape Modeling and Applications 2005 (SMI '05) pp. 4-12.

International Search Report and Written Opinion issued for PCT/US2008/056668; Dated: Jul. 14, 2008; 10 Pages.

Alexandre X. Falcao et al.: "User-Steered Image Segmentation Paradigms: Live Wire and Live Lane"; Graphical Models and Image Processing, vol. 60, Issue 4 (Jul. 1998); pp. 233-260.

Tony F. Chan et al.; "Active Contours Without Edges"; IEEE Transactions on Image Processing; vol. 10, Issue 2, Feb. 2001; pp. 266-277.

Tamal K. Dey et al.; "Shape Segmentation and Matching with Flow Discretization"; Proc. Workshop Algorithms Data Structures (WADS 03), LNCS 2748, F. Dehen, J.-R. Sack, M. Smid Eds., pp. 25-36, 2003.

International Search Report and Written Opinion issued for PCT/US2008/056673; Dated: Aug. 19, 2008; 9 Pages.

Website Interview by Tom Sassoon, Parts I-IV ; http://www.variety.com/index.asp?layout=videoBC&bcpid=1529573051; Optical Disk.

International Search Report and Written Opinion issued for PCT/US2008/056719; Dated: Sep. 3, 2008; 9 Pages.

International Search Report and Written Opinion issued for PCT/US2008/056697; Dated: Sep. 4, 2008; 10 Pages.

International Search Report and Written Opinion issued for PCT/US2008/056716; Dated: Aug. 22, 2008; 8 Pages.

International Search Report and Written Opinion issued for PCT/US2008/056388; Dated: Aug. 20, 2008; 9 Pages.

International Search Report and Written Opinion issued for PCT/US2008/056384; Dated: Aug. 20, 2008; 11 Pages.

International Search Report and Written Opinion issued for PCT/US2005/031664, dated Apr. 6, 2005.

Chun-Jen Tsai et al., Model-Based Synthetic View Generation from a Monocular Video Sequence', Image Processing, 1997 Proceedings, IEEE, vol. 1 Oct. 26, 1997, pp. 444-447.

Wurmlin S. et al., "3D Video Fragments: Dynamic point samples for Real-Time Free-Viewpoint Video", Computers and Graphics Elsevier UK, vol. 28 No. 1 Feb. 2004, pp. 3-14.

Labatut, Patrick, et al. "Efficient Multi-View Reconstruction of Large-Scale Scenes Using Interest Points, Triangulation and Graph Cuts," Computer Vision, 2007.ICCV 2007.IEEE 11th International Conference on Oct. 14-21, 2007, pp. 108.

Everitt, "Order-Independent Transparency," NVIDIA Corporation, Oct. 13, 2013, pp. 1-14. retrieved from <http://replay.web.archive.org/20031011233027/http://developer.nvidia.com/object/order_independent_transparency.html>.

Huang, et al,, "Automatic data segmentation for geometric feature extraction from unorganized 3-D coordinate points," IEEE Transations on Robotics and Automation, Jun. 2001, pp. 268-279. vol. 17, No. 3.

Lee, et al., "Patch-based Algorithms for Constrained Texture Synthesis and Labeled Texture Transfer," Aug. 25-Aug. 27. 2002, pp. 1-7.

Meyer, et al, "Segmentation of 3D triangulated data points using edges constucted with a C1 discontinuous surface fitting", Computer-Aided Design, Nov. 2004, pp. 1327-1336, vol. 36, No. 13.

Moustakas, et al., "Steroscopic video generation based on efficient layered structure and motion estimation from a monoscopic image sequence", IEEE Transactions on Circiuts and Systems for Video Technology, Aug. 2005, pp. 1065-1073, vol. 15, No. 8.

Chang, et al., "On an Analysis of Static Occlusion in Stereo Vision," IEEE <http://ieeexplore.iee.org/stamp/stamp.jsp?tp=&arnumber=139799>, 1991, 2 pages.

* cited by examiner

US 8,655,052 B2

METHODOLOGY FOR 3D SCENE RECONSTRUCTION FROM 2D IMAGE SEQUENCES

TECHNICAL FIELD

The invention relates generally to computer reconstruction, and more particularly, to the reconstruction of scene using 2-dimensional (2D) to 3-dimensional (3D) conversion.

BACKGROUND OF THE INVENTION

Humans perceive the world in three spatial dimensions. Unfortunately, most of the images and videos created today are 2D in nature. If we were able to imbue these images and videos with 3D information, not only would we increase their functionality, we could dramatically increase our enjoyment of them as well. However, imbuing 2D images and video with 3D information often requires completely reconstructing the scene from the original 2D data depicted. A given set of images can be used to create a model of the observer together with models of the objects in the scene (to a sufficient level of detail) enabling the generation of realistic alternate perspective images of the scene. A model of a scene thus contains the geometry and associated image data for the objects in the scene as well as the geometry for the cameras used to capture those images.

In reconstructing these scenes, features in the 2D images, such as edges of objects, often need to be extracted and their positions ascertained relative to the camera. Differences in the 3D positions of various object features, coupled with differing camera positions for multiple images, result in relative differences in the 3D to 2D projections of the features that are captured in the 2D images. By determining the positions of features in 2D images, and comparing the relative locations of these features in images taken from differing camera positions, the 3D positions of the features may be determined.

One technique, known as camera calibration, uses multiple 2D images captured using different camera perspectives of a scene. A set of point correspondences may then be found, which allows calculation of geometric attributes such as position and orientation of the camera for each image. This leads to the determination of 3D coordinates for features found in the 2D images. Many current methods of camera calibration, such as robot vision and satellite imaging, are geared toward full automation. M. Pollefeys, et al., "Visual Modeling with a Hand-Held Camera," *International Journal of Computer Vision*, September, 2004, pages 207-232, Volume 59, Number 3, Kluwer Academic Publishers, Manufactured in The Netherlands, describes a procedure using a hand-held video camera for recreating a 3D scene. In this process, a camera operator is in control of the camera, and collects images of an object from multiple perspectives. The images in the video sequence are then processed to obtain a reconstruction of the object that is suitable for stereoscopic 3D projection.

However, fundamental problems still exist with current camera calibration methods. For example, a typical motion picture will have a very large and predetermined image set, which (for the purposes of camera and scene reconstruction) may contain extraneous or poorly lit images, have inadequate variations in perspective, and contain objects with changing geometry and image data. Nor can the known camera calibration methods take advantage of the processor saving aspects of other applications, such as robot navigation applications that, while having to operate in real time using verbose and poor quality images, can limit attention to specific areas of interest and have no need to synthesize image data for segmented objects.

In addition, existing methods of camera calibration are not ideally suited for scene reconstruction. The reasons for this include excessive computational burden, inadequate facility for scene refinement, and the point clouds extracted from the images do not fully express model-specific geometry, such as lines and planes. The excessive computational burden often arises because these methods correlate all of the extracted features across all frames used for the reconstruction in a single step. Additionally, existing methods may not provide for adequate interactivity with a user that could leverage user knowledge of scene content for improving the reconstruction.

The existing techniques are also not well suited to the 2D to 3D conversion of things such as motion pictures. Existing techniques typically cannot account for dynamic objects, they usually use point clouds as models which are not adequate for rendering, and they do not accommodate very large sets of input images. These techniques also typically do not accommodate varying levels of detail in scene geometry, do not allow for additional geometric constraints on object or camera models, do not provide a means to exploit shared geometry between distinct scenes (e.g., same set, different props), and do not have interactive refinement of a scene model.

BRIEF SUMMARY OF THE INVENTION

The present invention is directed to a system and method for interactive and iterative reconstruction in a manner that helps to reduce computational requirements by generating a model from a subset of the available data, and then refining that model using additional data. Example embodiments directed to scene reconstruction, reconstruct a 3D scene from a plurality of 2D images of that scene by first generating a model of the 3D scene from a subset of the 2D images. The model can then be refined using specific characteristics of each image in the subset that are calculated using the other images in the subset. The model is further refined using images not in the original subset.

One illustrative embodiment performs the initial calculations for 3D scene reconstruction on a smaller number of key 2D frames, using a reduced number of user selected keypoints within those frames. Such embodiments of the invention can facilitate numerous aspects of iterative improvement that can increase the accuracy and reduce the computational demands of the reconstruction process. These improvements may include the ability to reconsider the choice of key frames and key vertices used in the initial reconstruction. These improvements may also include camera positions that are calculated for intermediate frames through a process of resectioning. In one embodiment, the resectioning is based on the observed projection of known 3D geometry. These improvements may further include mesh detail that can be added through a process of triangulation. In one embodiment, the triangulation is based on camera geometry calculated at alternate frames and the observed projection of that detail in those frames.

Embodiments of the invention can also allow a user to specify feature points in the form of a rough triangle mesh, or any mesh in which the vertices of the mesh specify the features of interest, rather than having software automatically generate all feature points. While automatic feature detection software may produce more features than would a user, the user is able to specify the set of features that are of interest. This then reduces the calculation burden. Embodiments of the invention may also allow the use of key frames for initial scene estimation, rather than weighting every frame uniformly. For example, key frames may be selected from a set of frames which are offset from each other by significant camera geometry differences.

Embodiments of the invention may also allow a user to control the selection of which frames are used in the reconstruction and which details in the object are reconstructed, along with the order of images used. Further, embodiments of the invention can allow segmentation of images into static and dynamic regions, where the segmentation may be further improved using the iterative calculations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

When starting with a sequence of 2D images captured by a moving camera or multiple cameras in different positions, 3D scene reconstruction typically involves combining camera calibration and object reconstruction which will generate the geometry for both the camera(s) and the objects in the scene. For example, if a camera has captured multiple images from different positions in a room, 3D geometry representing the motion of the camera and triangle meshes for features in the room, such as walls, furniture, and other objects will typically need to be determined.

Figure 1:
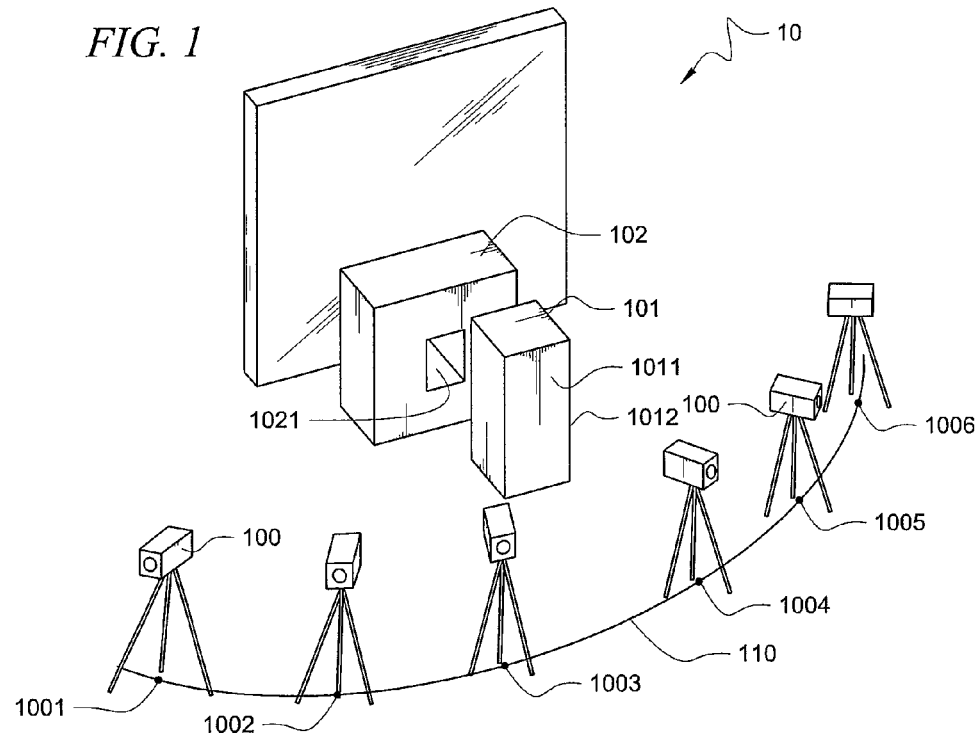
FIG. 1 illustrates an example three-dimensional scene being captured from multiple camera positions.

FIG. 1 shows scene 10 with camera 100 at multiple positions 1001-1006 joined by collection curve 100. Scene 10 includes objects 101 and 102. Object 101 has features, such as flat surface 1011 and edge 1012, which may be represented as a plane and a line, respectively in a triangle mesh. Object 102 has feature 1021 which may be occluded by object 101 in 2D images captured by camera 100 at some of positions 1001-1006.

FIGS. 2A-2F show images 2001-2006 of scene 10, captured by the views of camera 100 at positions 1001-1006, respectively (not shown). Different positions of object 102 are occluded by object 101 in each image 2001-2006. Feature 1021 is partially occluded in images 2002, 2003, and 2006 is completely occluded in images 2004 and 2005, and is fully visible in images 2001.

Figure 2A:
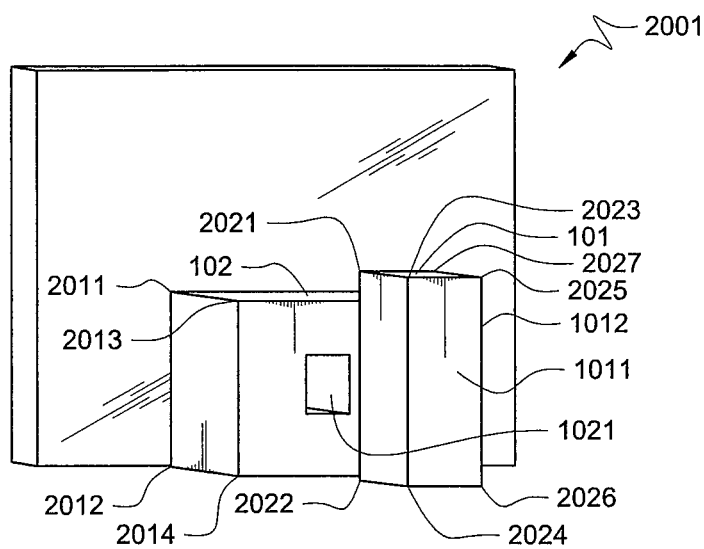
FIG. 2 illustrates multiple two-dimensional images of an example three-dimensional scene.
Figure 2B:
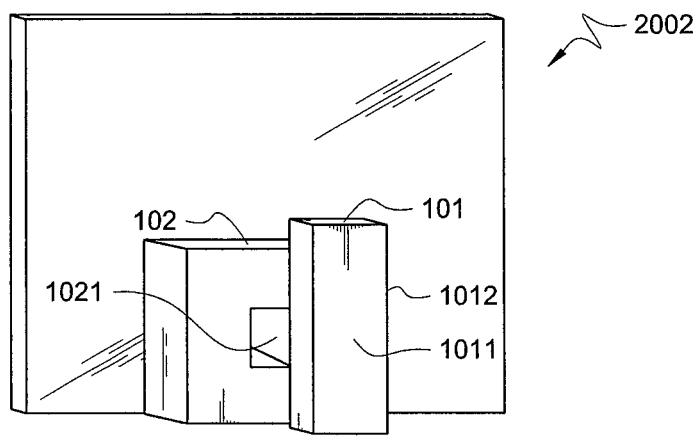
Figure 2C:
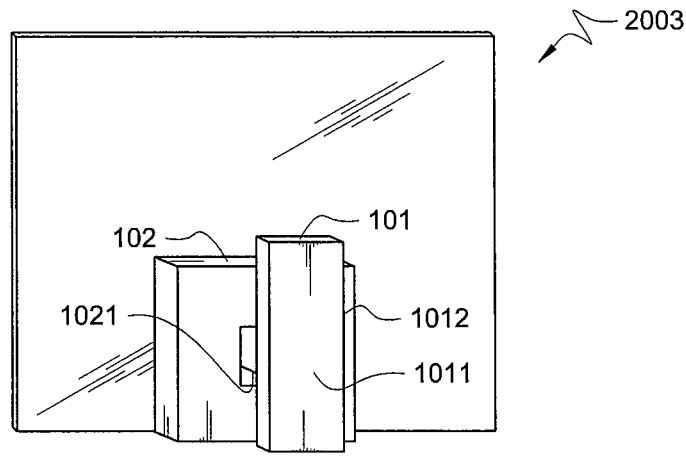
Figure 2D:
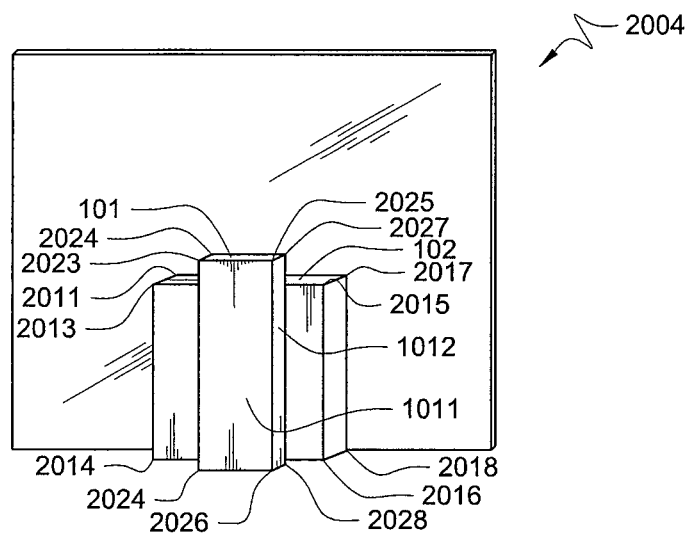
Figure 2E:
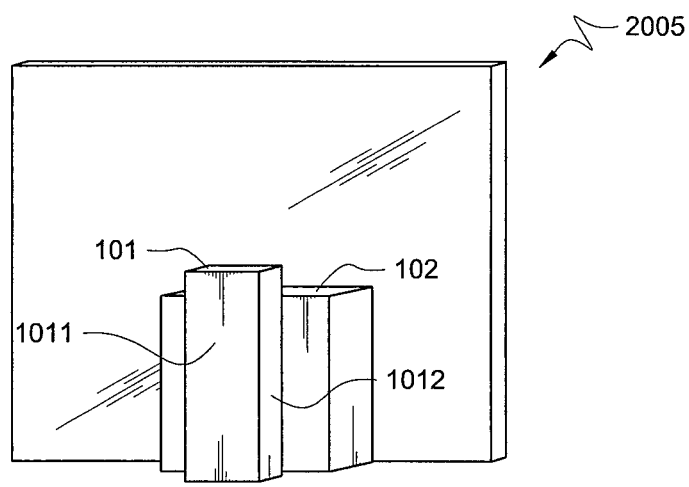
Figure 2F:
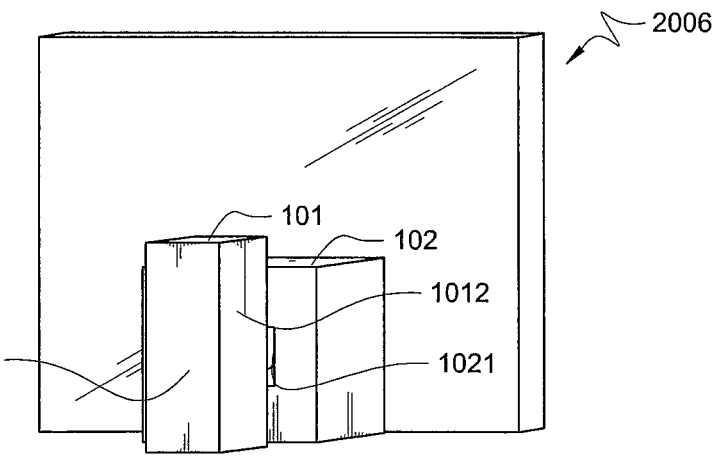
Figure 3:
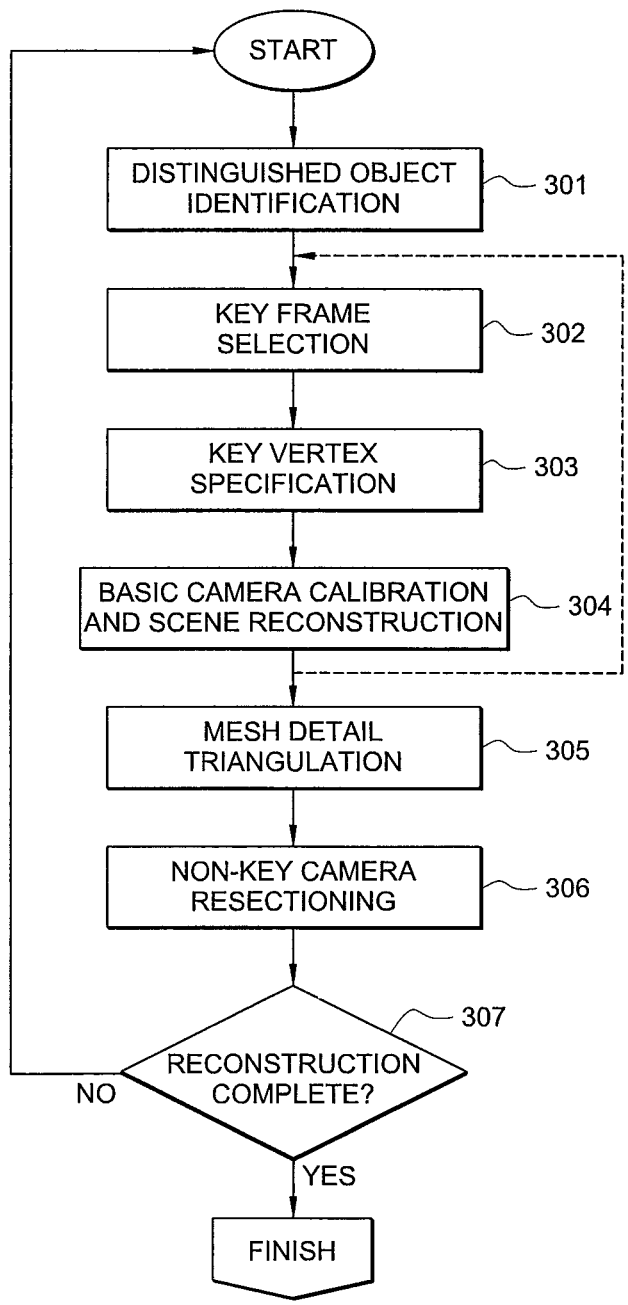
FIG. 3 is a flow chart illustrating scene reconstruction, according to one embodiment of the present invention.

FIG. 3 shows the steps which one illustrative embodiment uses to reconstruct a 3D scene from a set of 2D images. These steps may be performed iteratively as a process of refinement, with the intent that any number of steps may be skipped in a single iteration. For purposes of simplicity the conditional nature of each step is not made explicit in FIG. 3. Accompanying the description of each step is an explanation of how the process applies to the reconstruction of FIGS. 2A-2F of scene 10 using images 2001-2006.

However, before considering the individual steps, a brief description of the process is provided at a higher level. The goal of the process is to produce a camera model representing the perspective of each input image together with a model for each distinguished object in the scene. This process allows an object's appearance in each input image to be accounted for by rendering the object model according to the corresponding camera model. This process constructs models for static objects. Dynamic objects are objects whose geometries do change. Static objects are objects whose geometry within the scene do not change significantly throughout the available images, while ignoring the complementary class of dynamic objects. In some embodiments, the reconstruction of dynamic objects can be incorporated later through a separate process, such as standard modeling and animation techniques.

The camera model of an object illustratively encapsulates the object's geometry within the scene, and its projected appearance in each of the available images. An illustrative representation of such a model is a parametric surface mesh where each vertex has both a 3D location in scene coordinates, and a sequence (one per available image) of pairs containing an indication of the visibility of the corresponding image feature and the 2D location of that feature where visible.

For purposes of discussing the figures, images will be numbered sequentially, according to the simplest curve connecting all of the camera positions, whether or not the images were captured in that order, and whether or not the images were all captured by a single camera. For example, collection curve 110 of FIG. 1 is the simplest curve connecting positions 1001-1006, whether or not camera 100 moved in the arc shown by collection curve 110. Labeling ends of a collection curve as either start or finish may be somewhat arbitrary. That is, the starting image may actually be the first image collected, or the last if a video sequence is reversed, or may have been collected at another time. Intermediate frames are those images that are captured from camera positions on a collection curve that fall between the positions corresponding to the key frames. It will be understood that the present invention is not limited to any particular order or timing of image acquisition nor is it limited to any particular path for the acquisition mechanism.

Referring back to FIG. 3 and distinguished object identification process 301, process 301 determines which objects in the scene are to be distinguished by being explicitly modeled. Further, process 301 assigns to each distinguished object a mesh which approximates its structure at a minimal level of detail. In one embodiment, this assigned initial mesh is taken from a library of templates. However, other approaches can be used, such as meshes constructed specifically to match the observed object features using either user interaction or automated techniques.

It should be noted that the assignment of meaningful coordinate values to mesh vertices does not occur in process 301. Further, not all mesh structures need be specified at once. Instead separate iterations can be used to incorporate structures visible within a specific set of frames.

Applying process 301 to the images of FIG. 2A, objects 101 and 102 can be identified as distinguished static objects by considering frame 2001. At this frame a triangle mesh for object 101 can be specified to contain six faces and seven vertices corresponding to the three visible sides and the seven visible corners of the object. A triangle mesh for object 102 can be specified to contain two faces and four vertices corresponding to the left side and the four visible corners of the object. Next, considering frame 2006, in FIG. 2F, object's 101 mesh can be extended with two additional faces and an additional vertex corresponding to the now visible right side and lower back corner of the right side. Similarly, object's 102 mesh can be extended with six new faces and four new vertices corresponding to the front, top and right sides and the corners of the right side.

Process 302 performs the selection of key frames. For the purpose of this discussion, key frames refer to those available images for which camera geometry is calculated, non-key frames are referred to as intermediate frames. The set of key frames preferably are chosen to represent the full range of camera motion such that each key frame exhibits a significantly different camera perspective and that each key frame shares sufficient image information (viz. feature correspondences) with some number of other key frames. It should be noted that a balance in choosing key frames is needed. The more key frames selected typically result in more shared information, and thus, better results. However, this increases computational complexity, and can quickly become intractable.

Some embodiments of the present invention use at process 302 an automated selection process to select a subset of key frames from a set of available frames based on motion analysis. Other embodiments leverage a user's knowledge of the scene content through user input (acquired through a graphical user interface or other appropriate means) to guide the selection of the key frames.

In one embodiment, images 2001, 2004 and 2006, in FIGS. 2A, 2D and 2F, respectively, are designated as key frames, and images 2002, 2003 and 2005, in FIGS. 2B, 2C and 2E, respectively, can be designated as intermediate frames. Using these definitions, images 2002 and 2003 are between key frames 2001 and 2004, while image 2005 is between key frames 2004 and 2006. Note that while these definitions allow for images 2001-2006 to come from a video sequence as camera 100 moves along collection curve 110, the definitions do not require any specific capture sequence, nor do they require a single camera to have captured all the images. To simplify the discussion of the figures, a sequence of images will be assumed to have been collected by a single camera 100 moving along collection curve 110.

Process 303 performs the specification of key vertices. For the purposes of this discussion, key vertices refer to mesh vertices for which scene coordinate values are calculated later in process 304. The key vertices of a mesh are a subset of the existing vertices which express the essential mesh structure (viz. important features) at a minimal level of detail. However, other vertices can be used.

At each key frame (such as frames 2001, 2003 and 2006), each key vertex is marked as being visible or not visible due to object occlusions (either by dynamic objects or by other static objects, or the object itself). Further, at each key frame the image coordinates for visible key vertices are chosen to match the corresponding image feature. The process of specifying key vertices may be performed algorithmically, through user interaction, or by a combination of both.

Applying process 303 to the images of FIGS. 2A-F, all vertices of the initial meshes assigned to objects 101 and 102 can be specified as key vertices. In FIG. 2A, at frame 2001, the four vertices 2011, 2012, 2013, 2014 of the left side of object 102 are marked as visible, and have their image coordinates specified to match the corresponding image features (i.e., corners), while the remaining four vertices of object 102 are marked as not visible. At the same frame, the seven vertices 2021-2027 belonging to the left, front and top sides of object 101 are marked as visible and assigned image coordinates, while the remaining vertex 2028 (corresponding to the back lower right corner; not shown in this frame) is marked not visible. Advancing to key frame 2004, in FIG. 2D both objects 101 and 102 have seven of their eight vertices marked as visible (with only vertices 2012 and 2022 in the lower back left corner not visible). These visible vertices are assigned image coordinates. Finally, advancing to key frame 2006, in FIG. 2F, object 101 has the same set of seven visible vertices, (not marked in figure) which are again assigned image coordinates, while object 102 has the two back left vertices 2011 and 2012 (not marked in figure) marked as non-visible, and the remaining six vertices 2013-2018 (shown in FIG. 2D) marked visible, which are assigned image coordinates.

Basic camera calibration and scene reconstruction algorithm are performed at process 304. Through numerical optimization process 304 calculates camera geometry for each key frame and 3D scene coordinate values for each key vertex, such that the projection of each calculated scene-point through each calculated camera matches the corresponding image coordinates as accurately as possible. This process can be represented by the following equation:

$$Cf(Pv)=I(f,v) \quad \text{Equation (1)}$$

where Cf is the camera matrix at frame f, Pv is the same coordinate value for a visible vertex v, and I(f,v) is the observed image coordinate value for frame f at vertex v.

In some embodiments, the camera attributes and vertex coordinate values calculated in a previous iteration can be used as initial estimates for process 304.

According to the embodiment of FIGS. 2A and 2F, the initial application of process 304 results in calculated camera geometry for key frames 2001, 2004 and 2006, and calculated scene coordinate values for seven of the key vertices of both objects 101 and 102. In each object 101 and 102 the back lower left corner vertex 2012 and 2022 respectively is visible only in key frame 2001.

In some embodiments, at this point processes 302 and 303 can be repeated by adding key frame 2003 or key frame 2002. This ensures that all key vertices are visible in more than one key frame, and will be assigned scene coordinates by process 304.

The addition of mesh detail through triangulation is performed at process 305. Process 305 involves adding structure to the mesh (i.e., vertices, edges and faces), and then triangulating the location of each new vertex with reference to a set of frames for which camera geometry has already been calculated (e.g., key frames). The new vertices are assigned image coordinates at each of the selected frames. Then the underlying 3D scene location is calculated through triangulation. This assignment of image coordinates can be performed, in some embodiments, through user input or through application of automated feature detection and tracking algorithms. It should be noted that the more frames that are providing observed image coordinates for a vertex, the greater the accuracy of triangulated scene-coordinate point.

According to FIG. 2, in some embodiments, the mesh for object 102 is refined by adding structure to represent the rectangular recess 1021 in the front face. This additional structure consists primarily of eight vertices corresponding to the front and back corners of the recess 1021.

Scene coordinate locations for chosen front left vertices of recess 1021 can be obtained by selecting frames 2001 and 2003, appropriately positioning those chosen vertices in each of the selected frames, and then invoking the triangulation process. Similarly, scene coordinates for the front right vertices of the hole can be obtained via frames 2004 and 2006.

It should be noted that the four back vertices are not visible in any of the available images and so their locations in scene coordinates are chosen independent of either steps 304 or 305. This process can, in some embodiments, occur via user knowledge or by using domain-specific knowledge of object 102. However, other approaches can be used.

Calculation of the camera geometry for the intermediate frames through resectioning is performed at process 306. To resection the camera geometry for a chosen intermediate frame requires the selection of a set of vertices visible in that frame for which 3D scene coordinates have already been calculated (i.e. key vertices), and then adjusting the image coordinates of these vertices to match the observed projection of the corresponding features in that frame. Then process 306 invokes a resectioning algorithm to calculate the camera parameters at that key frame.

In one embodiment, an initial camera geometry estimate can be obtained by interpolating the camera parameters at adjacent key frames. This camera geometry estimate can be used to approximate the image coordinates of the selected vertices. From these estimated coordinates further refining through user interaction or automated feature detection/tracking can occur. Note that the more vertices involved and the greater the range of depths which they exhibit, the greater will be the accuracy of the resectioned camera.

Calculating the camera geometry at intermediate frame 2002 can be achieved by selecting the four visible vertices of object 102 together with the seven visible vertices of object 101. Then by positioning these selected vertices to match the corresponding image features and invoking the resectioning procedure the camera geometry can be calculated.

Decision 307 determines whether the construction is completed to a sufficient level of detail and quality or whether another iteration should perform further refinement. If the process is not completed then the process returns to step 301. For example, a scene may contain a long table with a number of chairs around it, but all of the chairs may not be visible in any one of the images. Process 304 may select a few initial key frames for use with process 305. In process 305, a user specifies rough meshes for some of the chairs in those initially-selected key frames. The meshes, which include only some of the chairs in the scene, are refined during process 306. Then, when returning to process 305, the user already has 3D models representing chairs. Also, when returning to process 305, the user may edit existing meshes. These are available for simplifying the modeling of any newly visible chairs in subsequently-added key frames. Further, when returning to process 306, newly added key frames will have points in common with previously-processed key frames. Since the 3D locations of these common points are known, camera calibration calculations are simplified.

Traditional camera calibration would attempt to calculate scene and camera geometry automatically, with equal weighting applied to each image used. However, for many types of calculations, including camera calibration, computational burden increases faster than linearly with the number of unknowns. By reducing the complexity of the initial models, the computational burden may be significantly reduced. Then, by leveraging the results of the lower resolution data, the refinement requires less of a computational burden than was avoided. The net result of simplifying the complexity for initial calculations, and then adding the detail back by a more efficient process; therefore, reduces overall computational time. Method 30 reduces the computational burden as compared with traditional methods, provides for interactive scene refinement, and allows user-defined meshes to express model-specific geometry, such as lines and planes.

Figure 4:
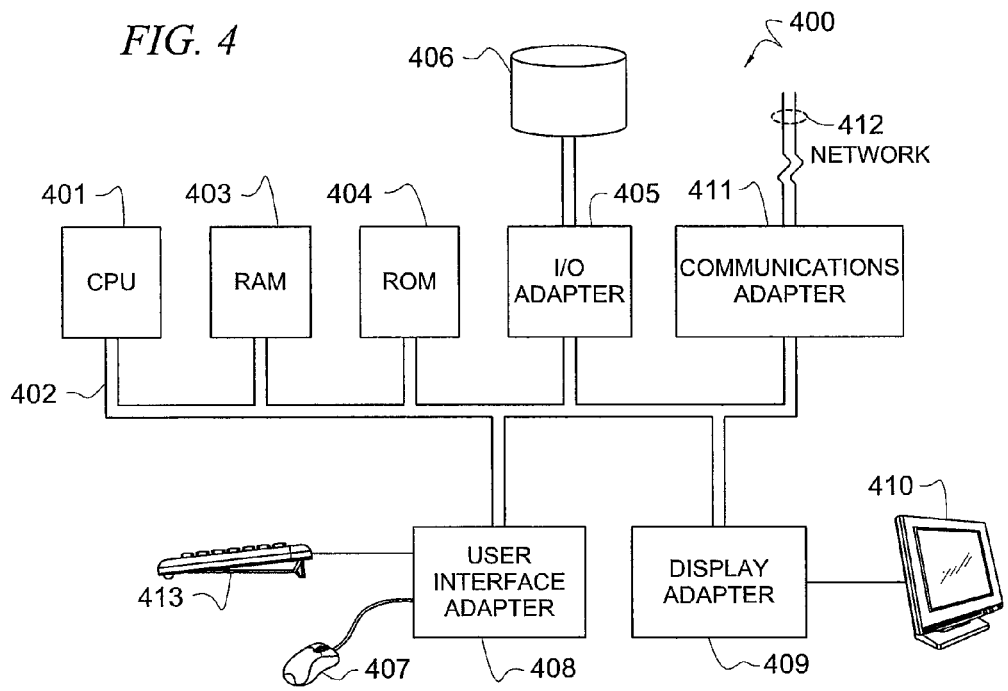
FIG. 4 illustrates a system of scene reconstruction arranged according to one embodiment of the present invention.

FIG. 4 illustrates computer system 400 adapted to use embodiments of the present invention by storing and/or executing software associated with the embodiments. Central processing unit (CPU) 401 is coupled to system bus 402. The CPU 401 may be any general purpose CPU. However, embodiments of the present invention are not restricted by the architecture of CPU 401 as long as CPU 401 supports the inventive operations as described herein. Bus 402 is coupled to random access memory (RAM) 403, which may be SRAM, DRAM, or SDRAM. Read-only memory (ROM) 404 is also coupled to bus 402, which may be PROM, EPROM, or EEPROM. RAM 403 and ROM 404 hold user and system data and programs, as is well known in the art.

Bus 402 is also coupled to input/output (I/O) adapter card 405, communications adapter card 411, user interface card 408, and display adapter card 409. The I/O adapter card 405 connects storage devices 406, such as one or more of a hard drive, a CD drive, a floppy disk drive, or a tape drive, to computer system 400. The I/O adapter card 405 is also connected to a printer (not shown), which would allow the system to print paper copies of information such as documents, photographs, articles, and the like. Note that the printer may be a printer (e.g., dot matrix, laser, and the like), a fax machine, scanner, or a copy machine. Communications adapter card 411 is adapted to couple the computer system 400 to a network 412, which may be one or more of a telephone network, a local area network (LAN) and/or a wide-area network (WAN), an Ethernet network, and/or the Internet network. User interface adapter card 408 couples user input devices, such as keyboard 413, pointing device 407, and the like, to the computer system 400. The display adapter card 409 is driven by CPU 401 to control the display on display device 410.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of scene reconstruction comprising:
   obtaining a plurality of images of a scene representing at least two perspective views of said scene;
   generating a 3-dimensional model of said scene using a first subset of said plurality of images, wherein said generating comprises selecting one or more vertices of said 3-dimensional model;
   calculating a perspective for each said image in said first subset based on one or more of said one or more selected vertices; and
   refining said model based on one or more of said calculated perspectives and a second subset of said images, wherein said second subset includes at least one image not in said first subset.

2. The method of claim 1 further comprising:
   refining said scene using said refined model.

3. The method of claim 1 wherein said first subset comprises:
   a first image captured with a first camera view; and
   a second image captured with a second camera view; and
   wherein said second subset comprises:
   a third image captured with a third camera view, wherein said third view is between said first view and said second view.

4. The method of claim 1 wherein said refining comprises iteratively adding one or more images from said plurality of images, not already in said second subset, to said second subset, and refining said scene using said second subset.

5. The method of claim 1 wherein user input is used to select an order of said plurality of images used in said scene reconstruction.

6. The method of claim 1 further comprising:
   determining whether said refining achieves a sufficient quality level.

7. The method of claim 6 wherein said refining is done when said sufficient quality level has not been achieved.

8. The method of claim 1 wherein said generating comprises a user selecting a subset of vertices from a plurality of vertices within at least one of said first subset of images, and refining said user selected subset of vertices.

9. The method of claim 1 wherein said generation further comprises automated selection of at least one of said first subset of images based on motion analysis.

10. The method of claim 1 wherein said selection is based on a user's knowledge of said scene acquired from a graphical user interface.

11. The method of claim 1, further comprising:
    employing a process of resectioning to calculate camera positions for said images of said second subset.

12. The method of claim 1, further comprising:
    using said images of said first subset as key frames; and
    using said images of said second subset as intermediate frames.

13. The method of claim 1 further comprising:
    selecting, for one or more of said calculated perspectives, one or more visible vertices and one or more non-visible vertices from said one or more selected vertices; and
    calculating a perspective for each image in said second subset of said plurality of images based on said one or more visible vertices.

14. The method of claim 1 wherein said selecting comprises selecting said one or more vertices by a user.

15. A non-transitory, machine-readable storage medium comprising instructions stored therein, the instructions executable by one or more processors to facilitate performing a method, said method comprising:
    obtaining a plurality of images of a scene representing at least two perspective views of said scene;
    generating a 3-dimensional model of said scene using a first subset of said plurality of images, wherein said generating comprises selecting one or more vertices of said 3-dimensional model;
    calculating a perspective for each said image in said first subset based on one or more of said one or more selected vertices; and
    refining said model based on one or more of said calculated perspectives and a second subset of said images, wherein said second subset includes at least one image not in said first subset.

16. The non-transitory machine-readable medium of claim 15 further comprising:
    selecting, for one or more of said calculated perspectives, one or more visible vertices and one or more non-visible vertices from said one or more selected vertices; and
    calculating a perspective for each image in said second subset of said plurality of images based on said one or more visible vertices.

17. The non-transitory machine-readable medium of claim 15 wherein said selecting comprises selecting said one or more vertices by a user.

18. A system, comprising:
    a memory storing executable instructions;
    one or more processors operatively coupled to said memory to execute the executable instructions from the memory, the one or more processors being configured to:
        obtain a plurality of images of a scene representing at least two perspective views of said scene;
        generate a 3-dimensional model of said scene using a first subset of said plurality of images, wherein said one or more processors are configured to select one or more vertices of said 3-dimensional model;
        calculate a perspective for each said image in said first subset based on one or more of said one or more selected vertices; and
        refine said model based on one or more of said calculated perspectives and a second subset of said images, wherein said second subset includes at least one image not in said first subset.

19. The system of claim 18, said one or more processors being further configured to:
    select, for one or more of said calculated perspectives, one or more visible vertices and one or more non-visible vertices from said one or more selected vertices; and
    calculate a perspective for each image in said second subset of said plurality of images based on said one or more visible vertices.

20. The system of claim 18 wherein said one or more processors are configured to select said one or more vertices in response to a selection made by a user.

* * * * *